(12) United States Patent

Knaeble et al.

(10) Patent No.: US 12,606,752 B2

(45) Date of Patent: Apr. 21, 2026

(54) DEWAXING CATALYSTS AND PROCESSES USING THE SAME

(71) Applicant: ExxonMobil Technology and Engineering Company, Annandale, NJ (US)

(72) Inventors: William J. Knaeble, Bridgewater, NJ (US); Scott J. Weigel, Allentown, PA (US); Preeti Kamakoti, Berkeley Heights, NJ (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 259 days.

(21) Appl. No.: 18/271,369

(22) PCT Filed: Jan. 24, 2022

(86) PCT No.: PCT/US2022/070310

§ 371 (c)(1),
(2) Date: Jul. 7, 2023

(87) PCT Pub. No.: WO2022/170298

PCT Pub. Date: Aug. 11, 2022

(65) Prior Publication Data

US 2024/0093100 A1 Mar. 21, 2024

Related U.S. Application Data

(60) Provisional application No. 63/145,239, filed on Feb. 3, 2021.

(51) Int. Cl.
*C10G 45/64* (2006.01)
*B01J 21/04* (2006.01)
(Continued)

(52) U.S. Cl.
CPC .............. *C10G 45/64* (2013.01); *B01J 21/04* (2013.01); *B01J 29/7461* (2013.01);
(Continued)

(58) Field of Classification Search
CPC .......... C10G 70/043; C10G 2300/1033; C10G 2300/201; C10G 2300/4062; C10G 2300/4081
See application file for complete search history.

(56) References Cited

U.S. PATENT DOCUMENTS 4,749,467 A 6/1988 Chen et al.
4,892,646 A 1/1990 Venkat et al.
(Continued)

FOREIGN PATENT DOCUMENTS

EP 3239276 11/2017
EP 3239276 A1 * 11/2017 ............. C10G 1/086
(Continued)

OTHER PUBLICATIONS

International Search Report and Written Opinion for PCT/US2022/070310 dated Apr. 19, 2022.
(Continued)

*Primary Examiner* — Ellen M McAvoy
*Assistant Examiner* — Chantel Graham
(74) *Attorney, Agent, or Firm* — C. Tumey Law Group PLLC

(57) ABSTRACT

Provided herein are catalysts for dewaxing of a feedstock, the catalyst comprising between about 40 wt. % and about 99.9 wt. % zeolite, between about 0 wt. % and about 40 wt. % binder and at least about 0.1 wt. % noble metal, as well as catalyst systems, methods and products produced using the catalysts. The zeolite having a crystal comprising a largest included sphere less than or equal to about 7.5 angstroms, a largest diffusing sphere greater than or equal to
(Continued)

about 5.0 angstroms, and a silica to alumina ratio greater than or equal to about 100:1. The catalyst having a temperature-programmed ammonia desorption ("TPAD") of less than about 0.25 mmol/g.

22 Claims, 4 Drawing Sheets

(51) Int. Cl.

| | | |
|---|---|---|
| *B01J 29/74* | (2006.01) | |
| *B01J 29/80* | (2006.01) | |
| *B01J 35/00* | (2006.01) | |
| *B01J 35/30* | (2024.01) | |
| *B01J 35/50* | (2024.01) | |
| *B01J 35/51* | (2024.01) | |
| *B01J 35/60* | (2024.01) | |
| *B01J 35/61* | (2024.01) | |
| *B01J 35/64* | (2024.01) | |
| *B01J 37/00* | (2006.01) | |
| *B01J 37/02* | (2006.01) | |
| *B01J 37/08* | (2006.01) | |
| *B01J 37/10* | (2006.01) | |
| *B01J 37/18* | (2006.01) | |

(52) U.S. Cl.
CPC ........... *B01J 29/7469* (2013.01); *B01J 29/80* (2013.01); *B01J 35/19* (2024.01); *B01J 35/394* (2024.01); *B01J 35/50* (2024.01); *B01J 35/51* (2024.01); *B01J 35/615* (2024.01); *B01J 35/643* (2024.01); *B01J 37/0009* (2013.01); *B01J 37/0201* (2013.01); *B01J 37/08* (2013.01); *B01J 37/10* (2013.01); *B01J 37/18* (2013.01); *B01J 2229/16* (2013.01); *B01J 2229/186* (2013.01); *B01J 2229/36* (2013.01)

(56) References Cited

U.S. PATENT DOCUMENTS

| | | |
|---|---|---|
| 5,456,820 A | 10/1995 | Forbus, Jr. et al. |
| 2011/0315596 A1 | 12/2011 | Prentice et al. |
| 2020/0377431 A1 | 12/2020 | Ide et al. |

FOREIGN PATENT DOCUMENTS

| | | | | |
|---|---|---|---|---|
| WO | 2007019196 | 2/2007 | | |
| WO | 2012134484 A1 | 10/2012 | | |
| WO | 2019201627 | 10/2019 | | |
| WO | WO-2019201627 A1 * | 10/2019 | ........... | B01J 29/703 |
| WO | 2020046579 | 3/2020 | | |

OTHER PUBLICATIONS

Chinese Office Action for CN Patent Application No. 202280008492.1 dated May 15, 2025. English Translation with Original Untranslated Version, PDF file. 25 pages.

Foster et al., A geometric solution to the largest-free-sphere problem in zeolite frameworks, 90 Microporous Mesoporous Materials 32-38 (2006).

Chinese Office Action for CN Patent Application No. 202280008492.1 dated Aug. 1, 2025. English Translation with Original Untranslated Version, PDF file. pp. 25.

Lianzhang, Chen. "Zeolite Molecular Sieves Catalysis." Dalian University of Technology Press, Dec. 1990. English Machine Translation with Original Untranslated Version, PDF file, 14 pages.

Korean Office Action for KR Patent Application No. 2023-7025552 dated Sep. 11, 2025. English Translation with Original Untranslated Version, PDF file. 18 pages.

* cited by examiner

DEWAXING CATALYSTS AND PROCESSES USING THE SAME

FIELD OF THE INVENTION

The present invention relates to a catalyst, catalyst system and process for dewaxing a feedstock and more particularly to a zeolite-based catalyst, a system and a dewaxing process using the zeolite-based catalyst to produce base stocks, including improving base stock yields and/or reducing cost of production.

BACKGROUND OF THE INVENTION

Ongoing efforts to improve base stock yield of dewaxing processes have included upgrading hydrocarbon feedstocks and enhancement of activity of the catalyst used in the dewaxing process. Dewaxing by isomerization includes a catalytic reaction dependent upon catalyst pore structure as well as the size of reactant and product molecules. Zeolite-based catalysts having a noble metal as a hydrogenation component have been shown to improve hydrocarbon conversion performance and isomerization of n-paraffins and naphthene, as well as reduce pour point of paraffinic charged stocks. To increase activity, zeolite content of the catalyst can be increased, yet can be accompanied by higher costs of materials depending on manufacturing process.

Most selective dewaxing catalysts used in a hydroisomerization process have a pore structure which confines the molecules to prevent undesirable side reactions and over-isomerization. Although pour point reduction can arise from cracking, pour point reduction is preferably achieved when derived from isomerization. However, often dewaxing catalysts have low paraffin isomerization selectivity. Further, few catalysts have been reported to be efficient in selectively isomerizing the waxes without cracking to a lower boiling point species such as fuels and gases. As a result, the paraffinic charged stocks often contain residual wax that needs to be dewaxed in order to meet target lube cloud points or pour points. Dewaxing is then achieved through an additional process step such as a solvent or catalytic dewaxing process

SUMMARY OF THE INVENTION

According to an embodiment of the present invention, a catalyst useful for dewaxing a feedstock comprises between about 40 wt. % and about 99.9 wt. % zeolite that comprises a crystal having a largest included sphere less than or equal to about 7.5 angstroms, a largest diffusing sphere greater than or equal to about 5.0 angstroms, and a silica to alumina ratio greater than or equal to about 100:1. It also comprises between about 0 wt. % and about 60 wt. % binder. The binder can be selected from alumina, silica, titania or a mixture thereof. The catalyst further comprises greater than or equal to about 0.1 wt. % noble metal and has a TPAD of less than or equal to about 0.25 mmol/g.

In another embodiment, selective catalysts for high yield selective dewaxing of hydrocarbon feedstock comprising a zeolite having a crystal are described. The crystal has a largest included sphere of about 7.5 angstroms and a largest diffusing sphere of about 5.0 to about 5.1 angstroms, a large pore size and 12 ring members (12 MR).

According to another embodiment, a catalyst system for dewaxing to produce a composition, such as a base stock, including base stocks for lubricants, process oils, fluids and the like, comprising a catalyst bed having two or more separate regions in a stacked configuration is provided. The two or more separate regions comprise a first region and a second region. The first region comprises a first catalyst as described in the preceding paragraph. The second region comprises a second catalyst having a zeolite having a crystal pore opening that is smaller than a crystal pore opening in the first catalyst. The crystal has 11 ring members (11 MR) or less, a medium pore size, and a silica alumina ratio greater than or equal to about 50. The first region and the second region are in fluidic communication providing a fluidic pathway for a composition such as a feedstock, intermediate or product (for example, base stock or process oil) to pass from the first region to the second region.

According to a further embodiment, provided herein is a process for dewaxing to produce compositions such as base stocks, including base stocks for lubricants (lubricant base stocks), process oils, fluids and the like, comprising contacting a hydrocarbon feedstock with one or more of the catalysts or catalyst systems to provide an increased yield of about 5 percent or greater in the base stock product in comparison to the hydrocarbon feedstock that has not been contacted with the catalyst or the catalyst systems when dewaxed under equivalent catalytic conditions.

According to another embodiment, a method of selecting catalysts for high yield dewaxing of feedstocks is provided. The method comprises: (i) determining a largest included sphere and a largest diffusing sphere of a zeolite comprising a crystal; (ii) providing a catalyst comprising between about 40 to about 100 wt. % of the zeolite, between 0 about 60 wt. % binder, and a noble metal in an amount greater than or equal to about 0.1 wt. %; (iii) treating the catalyst with steam or by dealumination to reduce the hexane cracking activity of the catalyst to below 50; and (iv) dewaxing a hydrocarbon feedstock using the catalyst to provide improved yields in a base stock product. The largest included sphere of the crystal is less than or equal to about 7.5 angstroms and the largest diffusing sphere of the crystal is greater than or equal to about 5.0 angstroms. The zeolite comprises a large pore size and 12 ring members (12) and a silica alumina ratio greater than or equal to 100:1.

DETAILED DESCRIPTION OF THE INVENTION

Figure 1:
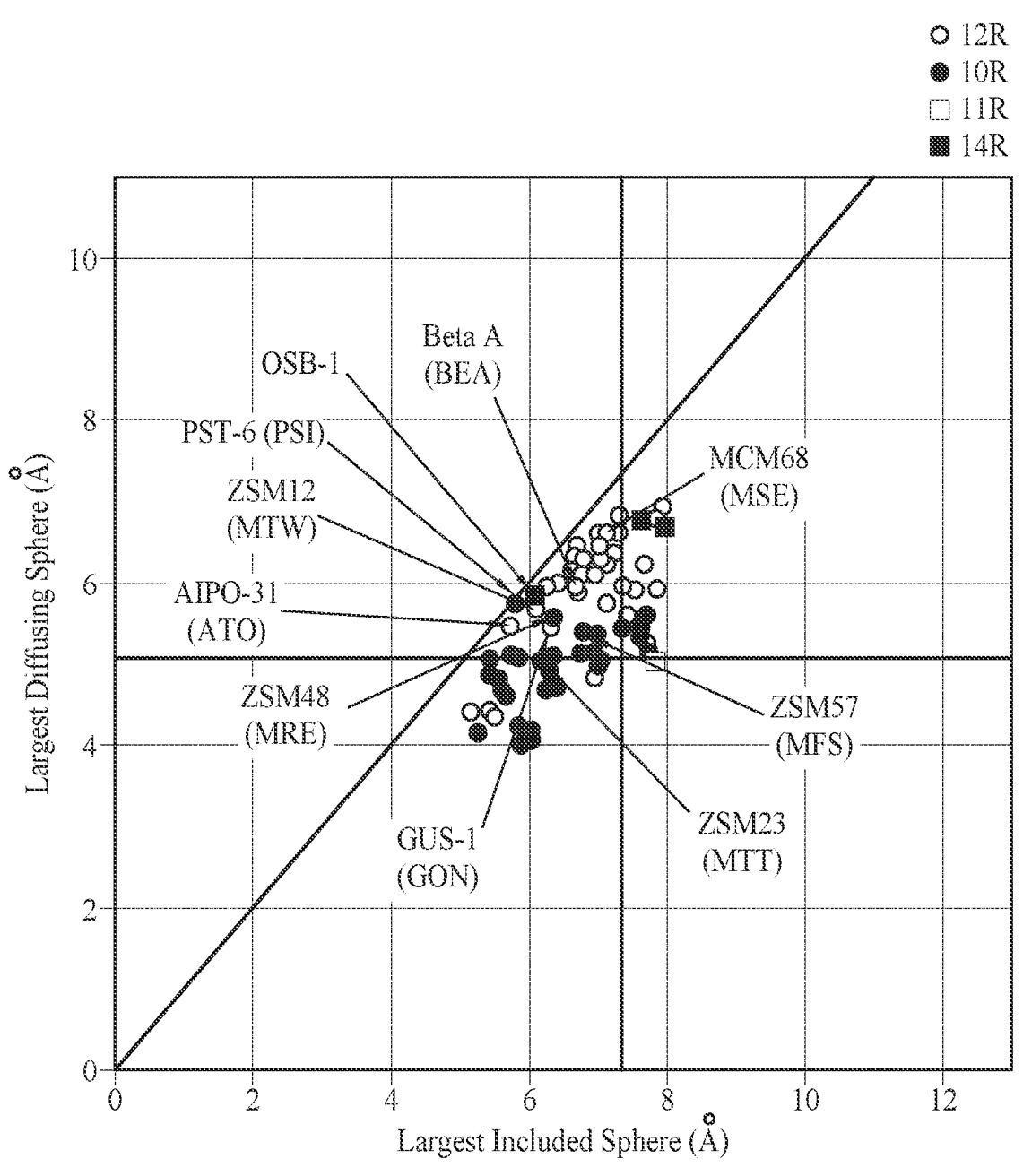
FIG. 1 is a plot showing largest diffusing sphere versus largest included sphere for different catalyst frameworks.

Despite certain advances made in dewaxing, the present inventors recognized that a need existed for catalysts that have greater selectivity in various product ranges and produce higher yields of base stock with improved characteristics on an economically attractive basis. The present inventors discovered catalysts that unexpectedly have greater selectivity in various product ranges and that produce higher yields of base stock, produce base stock with improved characteristics, such as high viscosity index and low pour point, and/or produce base stock at a lower cost.

According to various embodiments, catalysts provided herein are capable of operating with a wide range of feeds to produce a range of base stocks, including base stocks for lubricants, process oils, fluids and the like, with high yields and good performance characteristics. Such characteristics include, for example, low pour point, low cloud point, and high viscosity index ("VI").

Prior to dewaxing, crude fractions used to produce base stocks are generally subjected to one or more refining steps to remove heteroatoms, aromatics, and polycyclic naphthenes. Upgrading to a higher viscosity index can be accomplished by solvent extraction, hydroprocessing, and/or a combination of the two steps. Recent volatile crude oil prices have led to the growth of several alternative methods for crude oil extraction around the globe. These extraction methods can often produce sour crude oil, crude oil with a high sulfur content. At the same time, the demand for high sulfur products is disappearing. This necessitates that refiners are now required to reduce the product sulphur content before it can be sold. This is most commonly done by hydroprocessing.

Generally, hydroprocessing is used to denote those processes used to reduce the boiling range of a feedstock as well as remove impurities such as metals, sulfur, nitrogen and high carbon forming compounds. In hydroprocessing, feed conversion levels of 25 to 65% can be attained. Other names applied to this operation are hydroconversion, hydrorefining and resid HDS. Although vacuum resids can be used as feedstocks, most units use heavy vacuum gas oils typically taken off the bottom of the initial vacuum towers as feeds because lower viscosities and impurity levels provide better overall operations and greater impurity reductions. The atmospheric gas oil fraction can be hydrotreated to reduce aromatic contact and improve cetane number. The vacuum gas oil fraction can be used as conventional FCC unit feed. The vacuum tower bottoms can be sent to a heavy oil cracker or coker.

Hydroprocessing, hydrocracking, hydrotreating, and hydrodesulfurization are terms often used interchangeably in the industry because hydrodesulfurization and hydrocracking, and desulfurization operations can occur simultaneously and it is relative as to which predominates. Generally, however, hydroprocessing refers to two separate but similar processes: hydrocracking and hydrotreating. Hydrocracking typically refers to processes in which most of a feed is converted to products with boiling ranges lower than that of the feed. Hydrotreating generally refers to a relatively mild operation whose primary purpose is to saturate olefins and/or reduce the sulfur and/or nitrogen content (and not to change the boiling range) of the feed.

Hydrocracking is a process that breaks down complex hydrocarbon molecules into simpler ones by using a catalyst and an elevated partial pressure of hydrogen gas through established and reliable methods for transforming low value heavy oil fractions into higher value products. Although it is a more demanding hydrotreating process, hydrocracking is rapidly emerging as the principle conversion technology to maximize yield based on an ability to produce ultra-low sulfur product. Also, hydrocracking is a process that can provide an improvement in a viscosity index with a single hydroprocessing step. Hydrocracking is typically accompanied by a significant amount of conversion of the feedstock to products boiling below the initial boiling point of the feed.

Hydrotreating is a process of removing unwanted impurities such as sulfur, nitrogen, and metals by reacting with hydrogen in the presence of a catalyst. There are several possible configurations for hydrotreating. But at the heart of hydrotreating is a reactor section that features a high-pressure reactor vessel having proprietary reactor internal technology and catalysts. The configuration of the reactor can be adapted to suit the requirements for tolerable limits of impurities.

Hydrocracking

Generally, hydrocracking is a reaction of a waxy feed, usually a paraffinic distillate or deasphalted oil (DAO), and hydrogen in the presence of a catalyst that promotes molecular reorganization and cracking. The reaction includes saturation of aromatics (hydrodearomatization) and nearly complete elimination of sulfur (hydrodesulfurization) and nitrogen (hydrodenitrification) in which some lower molecular weight products are produced by cracking and there is some opening of cycloparaffin rings. These reactions take place normally in a trickle bed downflow reactor at high hydrogen pressures (1500 to 4000 psi) and temperatures in excess of 315° C. The hydrocracking catalyst has a dual function since it promotes both cracking and hydrogenation. Fractionation provides the waxy lubes cuts which are subsequently dewaxed and hydrofinished.

In a hydrocracking process, a high-pressure pump delivers a hydrocracking feedstock to a fired heat exchanger, after which it is mixed with high-pressure recycled hydrogen and delivered to a reactor. Reactor effluent exits the reactor to a high-pressure separator that recycles excess hydrogen. After removal of light gases ($C_1$ to $C_5$, $H_2S$ and $NH_3$) in the low-pressure separator, the atmospheric tower fractionates naphtha, jet, and diesel products with waxy bottoms going to a vacuum tower where waxy lubes are fractionated. The cuts are sometimes sent to tankage and dewaxed by hydroisomerization.

If hydrocracking is employed, sometimes an amorphous bifunctional catalyst is used to promote the saturation and subsequent ring opening of the low-quality aromatic components in the feed to produce hydrocracked products which are relatively more paraffinic. Hydrocracking is typically carried out at high pressure primarily to minimize catalyst aging and to favor the removal of sulfur and nitrogen-containing species. Consistent with these process objectives, the hydrogen pressure in the hydrocracking stage is at least 800 psig (about 5500 kPa abs.) and usually is in the range of 1000 to 3000 psig (about 6900 to 20700 kPa abs). Normally, hydrogen partial pressures are at least 1500 psig (about 10500 kPa abs.). Hydrogen circulation rates of at least about 1000 SCF/Bbl (about 180 n·l·l.<−1>), and in the range of 2000 to 8000 SCF/Bbl (about 360 to 1440 n·l·l.<−1>) are suitable.

The viscosity index of a dewaxed base oil (base stock) is directly related to the viscosity index of the entrained oil in a waxy feedstock, as determined by solvent dewaxing, and to the wax content of the feedstock. Because the catalysts and catalytic systems described herein have paraffin isomerization ability, base stocks with a high VI are produced by dewaxing high wax content feedstocks such as slack waxes, foots oils, derivatives of waxy crude vacuum gas oils, and waxes produced by Fischer-Tropsch processing of synthesis gas.

In accordance with the various embodiments of the invention, hydrocracking is a process for upgrading the viscosity index of the base stock prior to dewaxing. However, other processes are practiced commercially for this purpose and are suitable for application of the technology described herein. Such processes include solvent extraction by either furfural, n-methyl-2-pyrrolidone ("NMP"), or phenol, and hydrotreating.

Hydrotreating

A difference between hydrotreating and hydrocracking is in the degree of boiling range conversion which occurs with conversion to 343° C. products typically being less than 10% of the feed characteristic for hydrotreating. Hydrocracking can act alone for treating vacuum gas oils to produce conventional quality base stocks with improved viscosity index. Hydrotreating, as described here, does not provide as significant a boost in viscosity index and must be used in conjunction with another VI improvement step, such as solvent extraction, to produce conventional quality base stocks.

Hydrotreating occurs typically over a base metal catalyst similar in composition to lube hydrocracking catalysts although hydrotreating catalysts do not require an acidic support. Operating pressures and temperatures are similar to those suitable for hydrocracking although while in practice hydrocrackers operate at H$_2$ partial pressures above 103.4 bar (1500 psig), hydrotreaters may operate at significantly lower pressures, less than 68.95 bar (1000 psig) for example. The degree of denitrogenation and desulfurization for hydrotreating may be as high as for hydrocracking but may be much lower because of lower operating pressures.

Often hydrotreating reactions are carried out below 427° C. to minimize cracking, and the feed can be heated to about 260° C. and about 427° C. Here, the feedstock is combined with hydrogen-rich gas enters the top of a fixed bed reactor. In the presence of a metal oxide catalyst, hydrogen reacts with oil to produce hydrogen sulfide, ammonia, saturated hydrocarbons and free metals. The metals remain on the surface of the catalyst and other product leaves the reactor as an oil-hydrogen stream. Reactor effluent is cooled before separating oil from hydrogen rich gas. Hydrogen is removed and the oil stripped of any remaining hydrogen sulfide and light ends in a stripper. Gas may be treated to remove hydrogen sulfide and recycled back to the reactor. Catalysts developed for hydrotreating typically include cobalt and molybdenum oxides on alumina, nickel oxide, nickel thio molybdate, tungsten and nickel sulfides and vanadium oxide. Nickel-containing catalyst generally require activation. Hydrotreating processes generally provide low boiling range conversions and operate at hydrogen partial pressures above 68.95 bar (1000 psig).

As described herein, a hydrocarbon feedstock can be produced by hydrocracking or hydrotreating and then dewaxed via hydroisomerization.

Hydrocarbon Feedstocks

In accordance with the various embodiments of the invention, hydrocarbon feedstocks (also referred to as "feedstocks") can have between about 15% and about 95% n-paraffins and can have a boiling point distribution of at least about 260° C. to about 704° C. The hydrocarbon feedstock can contain C$_{24}$-C$_{60}$ with a tail having a T$_5$ of about 371° C. and a T$_{95}$ of about 593° C. with less than about 1,000 ppm or less than about 200 ppm sulfur or nitrogen. The hydrocarbon feedstock can be mixed with hydrogen and preheated before contacting it with the catalyst. At least 95% of the wax can be in liquid form before contacting it with the catalyst.

Also, the feedstock can be Fischer-Tropsch wax with a melting point over about 50° C., less than about 7,000 ppm sulfur, and less than about 50 ppm nitrogen. The nitrogen content can be significantly less than about 50 ppm if hydrogen pressure is greater than about 500 psig (34 atm).

Products

Any product that can be produced using the catalysts and catalyst systems described herein are contemplated by the present invention. Various products, such as base stocks and process oils, may be produced using the catalysts, systems and methods of the present invention. According to various embodiments, the base stocks and/or process oils have improved characteristics, such as high VI and low pour point. The base stocks may be Group I, II or III base stocks as classified by API. The base stocks may be of any viscosity grade including for example, light neutral, medium neutral, heavy neutral base stocks and bright stock. According to an embodiment, the base stocks have a kinematic viscosity at 100° C. ("KV100") of 1 to 42. According to various other embodiments, the base stocks have a KV100 of 1 to 3, 4 to 5, 6 to 8, 9 to 12, 13 to 17, or 18 to 25, 26 to 34, or 35 to 42.

Hydroisomerization

Hydroisomerization is a catalytic process for dewaxing waxy lube feedstocks and conversion of waxes in feedstocks to high viscosity index ("VI") base stocks by isomerization of n-paraffin structures to isoparaffins with one or more branches. These branches are usually methyl branches. Hydroisomerization is distinguished from catalytic dewaxing in that catalytic dewaxing cracks n-paraffin structures to C$_3$ to C$_8$ with minimal isomerization. Hydroisomerization causes isomerization and has the distinct advantage that VI is retained in the dewaxing step.

Advantages of hydroisomerization include: (1) lower capital costs for building a hydroisomerization plant; (2) reduced operating costs and emissions; (3) applicability to a full slate of products from 40N to bright stock, equal or better base stock yields; (4) product viscosity similar to that of the waxy feedstock; (5) higher base stock yields through hydrocracker severity reduction (when coupled to a hydrocracker); (6) reduced product formulation costs; (7) enhanced product performance due to higher product being paraffinic, production of Group III and Group III+ products, higher yields of Group III base oils from hydrocracker bottoms; (8) reduced volatility on account of the higher VI base stocks, and (9) production of high value middle distillates as by-products.

In accordance with various embodiments of the invention, the hydroisomerization process can include feedstocks containing low levels of sulfur and nitrogen to avoid poisoning the noble metal incorporated in the catalyst. Hydrofinishing reactors are often employed after dewaxing by hydroisomerization. Fractionation of the dewaxer/hydrofinisher reactor product can be required to separate by-products from base stock and establish base stock volatility.

Present Catalysts Useful for Dewaxing Hydrocarbon Feedstocks

In various embodiments, catalysts useful for dewaxing of a feedstock comprise between about 40 wt. % and about 99.9 wt. % zeolite, between about 0 wt. % and about 60 wt. % binder, and greater than or equal to about 0.1 wt. % noble metal. The zeolite comprises a crystal having a largest included sphere less than or equal to about 7.5 angstroms, a largest diffusing sphere greater than or equal to about 5.0 angstroms, and a silica to alumina ratio greater than or equal to about 100:1. The binder is selected from alumina, silica, titania or a mixture thereof. The present catalysts have a TPAD of less than or equal to about 0.25 mmol/g.

As described in the examples, the present catalysts may comprise ZSM-12 zeolite. In an embodiment, the catalyst has a TPAD of about 0.25 mmol/g or less. In an embodiment, the catalyst has a collidine uptake of about 250 μmol/g or less or equal to or less than about 200 μmol/g. In an embodiment, the zeolite has a crystal having a pore size between about 5.5 angstroms to about 6.5 angstroms. In an embodiment, the crystal has a large pore size. In an embodiment, the crystal has a largest included sphere of about 7.5 angstroms. In an embodiment, the crystal has a largest diffusing sphere of about 5.0 angstroms. In an embodiment, the crystal comprises 12 ring members (12 MR). In an embodiment, the catalyst has a total surface area of about 500 m$^2$/g or less. In an embodiment, the catalyst has a micropore volume greater than about 5 percent of the total pore volume. In an embodiment, about 20 percent or greater of total surface area of the catalyst is an external surface area. In an embodiment, the catalyst has greater than 25 percent metal dispersion. In an embodiment, the catalyst has an activity ($\alpha$) of about 5 to 50. In an embodiment, the catalyst has an activity ($\alpha$) between about 10 and about 30. In an embodiment, the catalyst has been steamed at temperatures greater than 482° C. In another embodiment, the catalyst has been steamed at a temperature of between about 482° C. and 593° C. for between about one hour and twenty hours. In another embodiment, the catalyst has been steamed at a temperature of about 537° C. for about 8 hours.

The "largest included sphere" represents the largest pore space within the zeolite framework. The "largest diffusing sphere" represents the largest diameter molecule that can pass through the framework of the zeolite. In other words, largest diffusing sphere is the smallest diameter pore space within the framework of the zeolite. The largest included sphere is greater than or equal to the largest diffusing sphere. The largest included sphere and largest diffusing sphere were computed geometrically by Delaunay triangulation with the following assumptions: both the framework T- and O-atoms are hard spheres of diameter 2.7 angstrom; all extra-framework atoms (i.e. water, organics and cations) are ignored; the interrupted frameworks are not terminated by hydrogen atoms, i.e. only T and O atoms are considered as hard spheres; the calculations are based on the coordinates of ideal SiO$_2$ frameworks in the highest possible symmetry. Details of the calculations can be found in M. D. Foster et al., *A Geometric Solution to the Largest-Free-Sphere Problem in Zeolite Frameworks,* 90 MICROPOROUS MESOPOROUS MATERIALS 32-38 (2006).

An important feature of the ZSM-12 zeolite component is to have a silica-to-alumina ratio that is sufficiently high to provide for a catalyst that exhibits desired catalytic properties of high activity while providing for a high yield. To provide for this, the ZSM-12 zeolite component has a silica-to-alumina ratio (also referred to sometimes herein as "SAR"; units are mol:mol) that is at least 50:1. The silica-to-alumina ratio, as the term is used herein, references the molar ratio of silica and alumina in the zeolite crystal. In the present catalysts, the SAR is greater than 60:1, or greater than 70:1, or greater than 75:1. An upper limit to the SAR of the ZSM-12 zeolite component is 500:1, 250:1, 200:1, 150:1, 110:1 and 100:1. If the SAR of the as-synthesized ZSM-12 zeolite is too low, it can be further dealuminated using methods known in the art to provide a dealuminated ZSM-12 zeolite having the desired silica-to-alumina ratio that can be used as a component of the inventive catalyst system. The ZSM-12 zeolite content of the catalyst can be at least 10 wt. % and at most 90 wt. % of the wet or dry weight of the catalyst.

The binder content of the catalyst can be in the range of from at least 10 wt. % wet weight or dry weight of the catalyst. When reference is made to binders herein, oxide or oxyhydroxides, or hydroxides are meant. Examples of binder materials are alumina, silica, zirconia, titania, germania, boria and mixtures of two or more of these like for example silica-alumina, silica-zirconia and silica-titania. Binders include alumina, titania, zirconia and/or silica. Alumina is a particularly useful binder in the ZSM-12 zeolite-based catalyst and the ZSM-48 zeolite-based catalyst used in the catalyst system. In an embodiment, the binder is aluminum oxide.

The zeolite-based catalyst used in the catalyst system can comprise a noble metal component selected from the group of noble metals consisting of palladium, platinum, and rhodium. In an embodiment, the noble metal is platinum. As demonstrated in the examples below, platinum can be useful in both the ZSM-12 zeolite-based catalyst and a ZSM-48 zeolite-based catalyst. Any known suitable method can be used to incorporate the noble metal component into the mixture. In various embodiments, the catalyst comprises greater than or equal to about 0.3 wt. % noble metal, and/or greater than or equal to about 0.4 wt. % noble metal.

Also provided herein are catalyst systems for dewaxing feedstocks to produce base stocks (including base stocks for lubricants, process oils, fluids and the like) comprising a reactor having at least one catalyst bed. The catalyst bed or beds have two or more separate regions in a stacked configuration. Each of the separate regions comprise the first region and the second region. The first region comprises a first catalyst comprising between about 40 wt. % and about 99.9 wt. % zeolite, between about 0 wt. % and about 60 wt. % binder, and greater than or equal to about 0.1 wt. % noble metal. The zeolite comprises a crystal having a largest included sphere less than or equal to about 7.5 angstroms, a largest diffusing sphere greater than or equal to about 5.0 angstroms, and a silica to alumina ratio greater than or equal to about 100:1. The binder is alumina, silica, titania or a mixture thereof. The catalyst has a TPAD of less than or equal to about 0.25 mmol/g. The second region comprises a second catalyst having a crystal of 11 ring members (11 MR) or less, a medium pore size and a silica alumina ratio greater than or equal to about 50. The zeolite has a smaller largest diffusing sphere in the second region than in the first region. For example, both ZSM-48 and ZSM-23 are 10 MR zeolites, but ZSM-23 has a smaller largest diffusing sphere than ZSM-48. The first region and the second region are in fluidic communication providing a fluidic pathway for a composition (such as a feedstock, intermediate, or product, for example) to pass from the first region to the second region. The catalyst in the first region can be ZSM-48, beta, or ZSM-12, or any combinations thereof. The catalyst in the second region can be ZSM-48 or ZSM-23, or combinations thereof.

In an embodiment, the catalyst bed or beds comprise about 25 percent to about 100 percent of the catalyst having a large pore size. In an embodiment, the catalyst of the second region has a collidine uptake less than or equal to about 100 μmol/g. In an embodiment, the catalyst of the second region has an alpha activity of greater than about 50. In an embodiment, the catalyst of the second region has a total surface area of less than or equal to 350 m$^2$/g. In an embodiment, the catalyst of the second region has an external surface area greater than or equal to 50 percent of a total surface of the catalyst. In an embodiment, the catalyst of the second region has a micropore volume of greater than 2 percent, or about 4 percent, of a total pore volume of the catalyst. In an embodiment, the catalyst of the second region comprises a ZSM-48 zeolite. The catalyst of the second region can have a noble metal content greater than 0.1 wt. %, or greater than 0.6 wt. %. The zeolite of the catalyst of the second region can have a SAR greater than about 50:1. The catalyst of the second region can have a TPAD of less than or equal to about 0.25 mmol/g. The catalyst of the second region can be steamed at temperatures greater than about 260° C., or between about 371° C. and about 482° C. The catalyst of the second region can be steamed at 371° C. for four hours. The catalyst of the second region can have greater than 25 percent metal dispersion.

Further, provided herein are processes for dewaxing a feedstock to produce base stocks (including base stocks for lubricants, process oils, fluids and the like) comprising contacting a hydrocarbon feedstock with one or more of the present catalysts to provide an increased yield of 371° C. lube fraction in an amount of about 5 percent or greater on a 150N slack wax feed in the base stock product in comparison to a base stock product that has not been contacted with one of the present catalyst when dewaxed under equivalent catalytic conditions. In an embodiment, the feedstock comprises sulfur and/or nitrogen. In an embodiment, a moderate activity of the catalyst has been preserved.

In accordance with the various embodiments of the invention, in a hydroisomerization process, the hydrocarbon feedstock is contact with the one or more of the present catalysts. Optionally, the hydrocarbon feedstock is converted by the present catalyst to form an intermediate product which is then passed directly to another catalyst that comprises a different zeolite than that of the present catalyst. In an embodiment, a cascaded two-bed catalyst system consists of one or more of the present catalysts followed by one or more type of catalysts that allow highly selective processing of wax isomerization with minimal gas formation. In cascading, the intermediate product can directly pass from the one or more of the present catalysts to the other type of catalyst without inter-stage separation. Optionally, light byproducts (e.g., methane, ethane) can be removed between the catalysts. The first and second stages of the dewaxing can be separated or integrated process steps (e.g., cascaded). When contacting the hydrocarbon feedstock, the one or more of the present catalysts can be kept at temperatures of about 204° C. to about 371° C., or about 260° C. to about 343° C., or about 271° C. to about 304° C. In the second stage of the process, the second catalyst can be kept at about 260° C. to about 427° C., or about 316° C. to about 371° C., or about 332° C. to about 349° C.

By way of example and as described below, in the present catalyst system, the present catalyst, a ZSM-12 based zeolite catalyst, is stacked on top of a ZSM-48 based zeolite catalyst. The ZSM-12 zeolite catalyst has an alpha activity of 50 or lower that may be contingent upon the zeolite loading. The other catalyst, the ZSM-48 zeolite catalyst, has an activity greater than 50. Alpha activity of the catalyst (sometimes referred to as an "alpha value," "a value," "alpha" or "a") can be modified by physical steaming, chemical dealumination, or any other known methods. In an embodiment, the catalyst is pretreated by steaming the catalyst in the first region between about 482° C. and 593° C. for between about one hour and twenty hours.

As provided herein, in an embodiment a reactor comprises the present catalyst system. The reactor can have one or more catalyst beds. Each catalyst bed comprises two or more separate regions in a stacked configuration. Each region can comprise one type of catalyst or comprise a mixture of a first and second catalyst, such that the regions together define a gradient decreasing in the concentration of the present catalyst and increasing in the concentration of the other catalyst in a step-wise, non-linear, fashion from one region to the next region through the catalyst bed. The catalyst systems can optionally comprise a first (inlet) region of the catalyst bed of the present catalyst and/or final (outlet) region of the catalyst bed of the other catalyst.

The concentration gradient of the mixture of catalysts through the catalyst bed or beds can be such that there is a linear decrease in the concentration through the catalyst system from the inlet (i.e. the region or regions of the catalyst bed which first come into contact with the hydrocarbon feedstock) to the outlet of the catalyst bed. Further, there can be a linear increase in the concentration of another catalyst through the catalyst system from the inlet (i.e. the region or regions of the catalyst bed which first come into contact with the hydrocarbon feedstock) to the outlet of the catalyst bed.

By "graduated mixture" is meant that there is a concentration gradient of the mixture of first and second catalysts throughout the catalyst bed or beds. The concentration gradient can be achieved within a single catalyst bed (such that the concentration of the present catalyst is decreasing and the concentration of the other catalyst is increasing through the catalyst bed in either a linear or non-linear fashion) or the concentration gradient can be achieved in separate catalyst beds, in separate reactors or multiple reactors, such that the concentration of the present catalyst (i.e., ZSM-12 zeolite catalyst) is decreasing and the concentration of the other catalyst (ZSM-48 zeolite catalyst) is increasing in a non-linear fashion in moving from one catalyst bed to the next.

By way of example, properties of the present catalysts and the other catalyst used in the present catalyst systems are provided below in Table 1.

TABLE 1

| Catalyst | ZSM-12 | ZSM-48 |
|---|---|---|
| Largest Included Sphere (Å)-crystal only | ≤7.5 (6.1) | ≤7.5 (6.4) |
| Largest Diffusing Sphere (Å)-crystal only | ≥5 (5.7) | ≥5 (5.6) |
| Pore Size-crystal only | Large | Medium |
| Pore Size (Å)-crystal only | 5.5-6.5 (pore is not circular) | 5.6 (pore is circular) |
| Ring Members (10 MR, 12 MR, etc.)-crystal only | 12 | 10 |
| Zeolite content (wt. %) | 40-100 | 40-100 |

The concentration gradient of the mixture is achieved within one or more catalyst beds, such that the concentration of the present catalyst is decreasing and the concentration of the other catalyst is increasing through the catalyst bed or beds. The decreases and increases in concentrations of the present catalyst and the other catalyst (the catalyst of the second region), respectively, through the catalyst bed can be in either a linear or non-linear fashion.

Higher base stock yields can be obtained using the arrangement employed in a stacked catalyst system, as compared to using a homogeneous, non-gradient mixture of the present catalyst and the other catalyst, that is, wherein the catalyst bed or beds contains a uniform (constant) concentration of the first and the second catalysts through the catalyst bed.

In a stack configuration, temperature of each catalyst can be controlled independently. Temperature choice partly depends on the liquid hourly space velocity of the feedstock.

The liquid hourly space velocity of the feedstock can be about 0.1-20 h$^{-1}$, about 0.5-5 h$^{-1}$, or about 0.5-2 h$^{-1}$. The contact time for both catalysts can be similar to each other. The liquid hourly space velocity in each stage can be different. The pressure for both catalysts can be similar to each other. A hydrogen co-feed flow rate can be about 100-10,000 scf/bbl (about 17.8-1,780 n·L·L$^{-1}$), or about 1,000-6,000 scf/bbl (about 178-1,068 n·L·L$^{-1}$), or about 1,500-3,000 scf/bbl (about 267-534 n·L·L$^{-1}$).

As further provided herein, the catalyst bed or beds comprise two or more separate regions in a stacked configuration, each region in the stacked configuration can separately have a catalyst volume ratio of the present catalyst to another catalyst in the range of 10:90 to 90:10, 20:80 to 90:10, and 40:60 to 85:15, provided that the regions together define a gradient decreasing in the concentration of the present catalyst and increasing in the concentration of another catalyst from one region to the next region through the catalyst bed.

Dependent upon the nature of the linear or non-linear concentration gradient required, a number of discreet mixtures of the present and the other catalyst in varying ratios can be prepared. The mixtures are then loaded into the catalyst bed to achieve the desired concentration gradient. Any type of reactor (e.g. a reactor in top-down or bottom-up flow) can be loaded in such a way that the hydrocarbon feedstock will pass through the catalyst bed comprising a mixture of the present catalyst and another catalyst where the concentration gradient of the mixture is achieved within the catalyst bed, such that the concentration of the present catalyst is decreasing and the concentration of the other catalyst is increasing through the catalyst bed.

When, for example, an industrial reactor is operated in a top-down flow, the preparation of the catalyst system will result in higher concentrations of the present catalyst in the top or upper regions of the catalyst bed than in the bottom or lower regions of the catalyst bed, which will have higher concentrations of the other catalyst. Below the present catalyst systems, another catalyst can be present for, e.g. hydrofinishing purposes.

The present catalyst systems are highly suitable for use in dewaxing of hydrocarbon feedstocks. The systems can be placed as the dewaxing section in any conventional line up comprising a section for dewaxing of hydrocarbon feedstocks. The hydrocarbon feedstock can be pre-treated upstream of the catalyst system, for example, in a separate guard or catalyst bed, to reduce or remove any nitrogen- and sulfur-containing compounds and/or aromatic compounds present therein. Alternatively, a further catalyst can be used upstream of the catalyst system in the same reactor bed in order to pre-treat the feedstock prior to contact with said catalyst system. A reactor can have a single reactor bed or a plurality of reactor beds.

Catalytic dewaxing is used to improve cold flow properties of diesel fuels and lube oils by selective hydroisomerization/hydrocracking of normal and slightly branched paraffins. In distillate dewaxing, the dewaxing process reduces the pour point of the feedstock at least 10° C., or at least 20° C. The present catalyst systems are useful for conventional diesel fuels dewaxing to deep dewaxing (Artie grade production) in first and second stage applications, in combination with high pressure hydrocracking or mild hydrocracking catalyst package, in mild hydrocracker bottoms pour point reduction for storage and transportation and/or to produce lubes of exceptional quality. This catalyst system is particularly useful for producing base oils.

Accordingly, provided herein are processes for dewaxing of a hydrocarbon feedstock comprising contacting a hydrocarbon feedstock with the present catalyst system at an elevated temperature, from about 200° C. to about 450° C. and a pressure of from about 5×10$^5$ to about 200×10$^5$ Pa. In various embodiments, temperature is from about 250° C. to 400° C. or from 275° C. to 375° C. Total pressure is from 15×10$^5$ to 170×10$^5$ Pa, and from 25×10$^5$ to 150×10$^5$ Pa.

In the dewaxing process, the liquid hourly space velocity of the hydrocarbon feedstock can be in the range of from 0.1 to 10 h$^{-1}$. As described herein, suitable hydrocarbon feedstocks to be employed in the dewaxing process present include mixtures of high-boiling hydrocarbons, such as, for instance, heavy oil fractions, and vacuum distillate fractions derived from an atmospheric residue, i.e. distillate fractions obtained by vacuum distillation of a residual fraction which in return is obtained by atmospheric distillation of a crude oil, as the feed. The boiling range of such a vacuum distillate fraction can be between about 300° C. and about 620° C., suitably between about 350° C. and about 580° C. However, deasphalted residual oil fractions, including both deasphalted atmospheric residues and deasphalted vacuum residues, can also be applied. The hydrocarbon feedstock can be a gas oil or a base stock. The hydrocarbon feedstocks can also be wax-containing feeds that can boil in range between about 130° C. and about 450° C., suitably between about 150° C. and about 390° C. These are the boiling ranges for diesel, kerosene and jet fuel.

As described herein, the feedstock can be a base stock (base oil). Such feedstocks can be wax-containing feeds that boil in the lubricating oil range typically having a 10% distillation point at 200° C. or higher, ranging to 600° C., as measured by ASTM D-2887-93. Examples of feeds having relatively high amounts of waxy compounds are synthetic waxy raffinates (Fischer-Tropsch waxy raffinates), hydrocracker bottom fractions (hydrowax), i.e., those fractions having a final boiling point of at least 320° C., or at least 360° C. and slack waxes obtained from the dewaxing of hydroprocessed or solvent refined waxy distillates. The wax content of the feedstock can be at least 50% by weight, at least 80% by weight or at least 90% by weight. The wax content is the content of compounds which are plastic at ambient temperature and melt above 45° C. to give a low viscosity liquid. The amount of wax can be determined by the ASTM method D3235. If the feedstock contains sulfur or nitrogen contaminants, for example, having sulfur levels up to 3% by weight and nitrogen levels up to 1% by weight, it can be advantageous to subject that feedstock to a hydrodesulphurisation and hydrodenitrogenation step prior to the dewaxing process using this catalytic system.

Furthermore, as described herein, the hydrocarbon feedstocks can be hydrotreated and/or hydrocracked before being subjected to dewaxing. Hydrotreating generally involves contacting feedstock with a hydrotreating catalyst at a temperature of up to 500° C., or from about 250° C. to about 500° C., and a hydrogen partial pressure of from 10×10$^5$ to 200×10$^5$ Pa, or from 30×10$^5$ to 130×10$^5$ Pa. Hydrocracking generally involves contacting feedstock with a hydrocracking catalyst at a hydrogen partial pressure (at the reactor inlet) in the range from 3×10 6 to 2.9×10 7 Pa, and from 8×10 6 to 1.75×10 7 Pa and a ratio of hydrogen gas to feedstock (total gas rate) in the range from 100 to 5000 Nl/kg, and in the range from 200 to 3000 Nl/kg.

Dewaxing Employing the Present Optimized Catalysts

To catalytically remove the undesirable waxy components without removing the desirable isoparaffinic components which contribute to high viscosity index in product, dewaxing with the catalyst described herein can isomerize n-paraffins together with the waxy, slightly branched chain paraffins, while highly branched chain iso-paraffins remain in the process stream. Shape selective dewaxing is more fully explained in U.S. Pat. No. 4,919,788, which is incorporated by reference in its entirety.

The present catalysts include a metal hydrogenation-dehydrogenation component comprising a noble metal or a combination of noble metals. The presence of the noble metal component leads to product improvement, especially VI, and stability. Aging of the shape-selective dewaxing catalyst is significantly retarded in the instant invention by synergistic combination with an upstream hydrotreating catalyst.

Shape-selective dewaxing using the highly constrained, highly shape-selective catalyst with hydrotreating catalysts upstream in a synergistic system may be carried out in dewaxing processes. Here, both catalysts may be in the same fixed bed reactor or the hydrotreating catalyst may be upstream in a separate bed. Reactor conditions can include temperatures from about 250° C. to about 500° C., or about 300° C. to about 450° C. and not higher than about 370° C. and pressure up to 206.8 bar (3000 psi), and more particularly to 172.4 bar (2500 psi). Space velocities extend from 0.1 to 10 hr$^{-1}$ (LHSV), over the synergistic catalyst system more usually 0.2 to 3 hr$^{-1}$. Operation at a higher space velocity than can be achieved with the dewaxing catalyst operating alone with acceptable aging, yet with a relatively low aging rate at equilibrium, is a critical feature of the instant invention.

Shape selectivity of catalyst is presumed due to a relatively small pore structure capable of differentiating different isoparaffins. 10-MR rings are considered to be medium pore while materials like ZSM-12 are considered to be "large" pores. All of this is contingent upon the shape of the opening, e.g., circular versus oval. The ability of a catalyst to preferentially convert normal paraffins and/or lightly branched paraffins and exclude highly branched isoparaffins reduces undesirable reactions including cracking (leading to low lube yield) and excessive isomerization (leading to low viscosity index) of low pour, highly branched isomers. Selectivity of the catalyst is consistent with low cracking activity, high lube yield, minimal viscosity loss and high lube VI (viscosity index) when isomerizing and dewaxing various wax feeds.

Dewaxing Processes

According to various embodiments of the present invention, it is contemplated that the present catalysts are used in various dewaxing processes. The following dewaxing processes are for illustration only. For example, U.S. Pat. No. 4,975,177, which is incorporated by reference in its entirety herein, discloses a two-stage dewaxing process for producing base stocks of high VI from waxy feedstocks. In the first stage of that process, the waxy feed is catalytically dewaxed by isomerization over zeolite beta. The product of the isomerization step still contains waxy species and requires further dewaxing to meet target pour point. The second-stage dewaxing employs either solvent dewaxing, in which case the rejected wax may be recycled to the isomerization stage to maximize yield, or dewaxing. The present catalysts can be used in the first stage or the second stage. Other useful catalysts for the second stage include ZSM-5, ZSM-22, ZSM-23, and/or ZSM-35, and any combinations thereof.

Dewaxing processes employing highly shape selective sieves as catalysts possess greater selectivity than conventional catalytic dewaxing processes. To improve catalytic activity and to mitigate catalyst aging, the present high selectivity catalysts often contain a hydrogenation/dehydrogenation component, frequently a noble metal. Such selectivity benefit is derived from the isomerization capability of the catalyst from its metallic substituent and its highly shape-selective pore structure. However, as known, ZSM-23, and some other highly selective catalysts used for lube dewaxing, have a unidimensional pore structure. This type of pore structure is particularly susceptible to blockage by coke formation inside the pores and by adsorption of polar species at the pore mouth. Therefore, such catalysts have been used commercially only for dewaxing "clean" feedstocks such as hydrocrackates and severely hydrotreated solvent extracted raffinates. In the development of shape selective dewaxing processes, key issues to be addressed are retardation of aging, preservation of high selectivity over the duration of the catalyst cycle, and maintenance of robustness for dewaxing a variety of feedstocks.

The problem of catalyst aging and extension of cycle length in dewaxing processes have been addressed. For example, U.S. Pat. No. 5,456,820 (Forbus et al.), which is incorporated by reference in its entirety herein, discloses a process in which a lube boiling range feedstock is catalytically dewaxed in the presence of hydrogen over a catalyst comprising an intermediate pore zeolite in the decationized form. Catalyst cycle length was found to be improved by optimizing the sequencing of various solvent extracted feedstocks.

Likewise, U.S. Pat. No. 4,892,646 (Venkat et al.), which is incorporated by reference in its entirety herein, discloses a process for increasing the original cycle length, subsequent cycle lengths and the useful life of a dewaxing catalyst. As taught, the catalyst is pretreated with a low molecular weight aromatic hydrocarbon at a temperature greater than 426° C., for a time sufficient to deposit between 2 and 30% of coke, by weight, on the catalyst. Pretreatment can be conducted in the presence of hydrogen gas.

Chen, et al. (U.S. Pat. No. 4,749,467), which is incorporated by reference in its entirety herein, discloses a method for extending dewaxing catalyst cycle length by employing the combination of low space velocity and a high acidity intermediate pore zeolite. The high acid activity and low space velocity reduce the start-of-cycle temperature. Because catalyst deactivation reactions are more temperature sensitive, low operating temperatures typically reduce the catalyst aging rate. The same principle has been found to apply to uni-dimensional constrained intermediate pore molecular sieves.

The degree of conversion to lower boiling species in the dewaxing stage will vary according to the extent of dewaxing desired at this point, i.e., on the difference between the target pour point and the pour point of the feed. It must be noted that the catalyst system of the instant invention is employed primarily to enhance the cycle length of the shape-selective catalyst. Product characteristics will be similar to those found in other shape-selective dewaxing processes. The degree of conversion also depends upon the selectivity of the shape-selective catalyst which is used. At lower product pour points, and with relatively less selective dewaxing catalysts, higher conversions and correspondingly higher hydrogen consumption will be encountered. Generally, conversion to products boiling outside the lube range, e.g., 315° C., more typically 343° C., will be at least 5 wt. %, and in most cases at least 10 wt. %, with conversions of up to about 40 wt. % being necessary only to achieve the lowest pour points or to process high wax content feeds with catalysts of the required selectivity. Boiling range conversion on a 343° C.+ basis will usually be in the range of 10-25 wt. %.

After the pour point of the oil has been reduced to the desired value by selective dewaxing, the dewaxed oil may be subjected to treatments such as mild hydrotreating or hydrofinishing, in order to remove color bodies and produce a lube product of the desired characteristics. Fractionation may be employed to remove light ends and to meet volatility specifications.

Additional features of the invention are described in the following non-limiting examples.

EXAMPLES

Example 1

Selection of Zeolite

Using a combination of DoE (design of experiment), evaluation of historical decane isomerization data, and high throughput experimentation, certain lead catalysts were identified. The first step in the development of the catalyst was to choose the zeolite framework as described below.

To select the framework to be optimized for dewaxing and as shown in FIG. 1, we plotted largest diffusing sphere versus largest included sphere for a number of catalyst frameworks. As also shown in FIG. 1, a dashed line having a slope of 1 can be used to represent this relationship. Accordingly, based on an evaluation of historical decane isomerization data, frameworks having a maximum largest included sphere of about 7.5 Å and a minimum largest diffusing sphere of about 5 Å were evaluated.

As plotted in FIG. 1, the maximum largest included sphere, minimum largest diffusing sphere, and the linear slope of largest included/diffusing sphere served as a perimeter indicating useful zeolite frameworks. As shown, numerous zeolites were plotted, many within the perimeter. Also shown is a ring size "R" for the various zeolites plotted. Surprisingly, a larger pore zeolite ZSM-12 showed some benefits in decane isomerization in a packed reactor that were further optimized using slack waxes.

Example 2

The catalyst described in this Example 2 is to be used in all comparisons as a reference point. All activity and selectivity comparisons will be made against this catalyst. The catalyst is prepared by extruding 65 weight percent ZSM-48 with 35 weight percent alumina. The green extrudate is dried, heated under nitrogen, ammonium exchanged, and heated in air to create the acid form of the catalyst. This acid form catalyst is then steamed at 890° F. for 3 hours to produce the active catalyst. The active catalyst is impregnated with a platinum amine nitrate solution, dried, and heated in air to create the metal oxide containing active catalyst. This catalyst is then reduced in the presence of hydrogen to reduce the oxide to the metal. This reduction can either be done in testing unit or ex situ. This catalyst has a TPAD of 0.28 mmol/g.

Example 3

Catalyst Optimization

Optimization experiments were performed for various catalysts having a ZSM-12 framework and a reference catalyst having a ZSM-48 framework (the reference catalyst is the catalyst described in Example 2) using a 150N slack wax feed. Isomerization conditions included a pressure of about 2000 psig, a hydrogen oil ratio of about 2000 scf/bbl, and a liquid hourly space velocity of about 1 h$^{-1}$. Each catalyst had a specific silica to alumina ratio, zeolite to binder ratio, noble metal content and was subject to particular steaming. Table 2 lists zeolite to binder ratio, silica to alumina ratio, noble metal content, steaming temperatures and alpha activity of the ZSM-12 catalysts optimized. Catalyst steam treatments lasted for about 4 hours. Catalysts were calcined by thermal treatment in an oxidizing atmosphere to thermally decompose the metal precursors into their respective Pt oxide.

TABLE 2

| | | | | | | | | | |
|---|---|---|---|---|---|---|---|---|---|
| Optimized ZSM-12-Based Catalysts | | | | | | | | | |
| Label | Wt. % Pt | Silica to alumina ratio | Zeolite to binder ratio | Steaming Temperature (° C.) | Alpha Activity ($\alpha$) | TPAD [mmol/g] | Collidine [μmol/g] | Total Surface Area [m$^2$/g] | External SA [%] |
| A | 0.4% | 140:1 | 90/10 | 649 | 6.7 | 0.08 | 39 | 177 | 49% |
| B | 0.2% | 140:1 | 90/10 | 649 | 6.7 | 0.08 | 39 | 177 | 49% |
| C | 0.2% | 250:1 | 40/60 | 649 | 7.2 | 0.13 | 65 | 245 | 80% |
| D | 0.5% | 140:1 | 40/60 | 566 | 21 | 0.16 | 82 | 272 | 78% |
| E | 0.4% | 140:1 | 40/60 | 566 | 21 | 0.16 | 82 | 277 | 77% |
| F | 0.6% | 215:1 | 65/35 | None | 46 | 0.25 | 211 | 374 | 53% |
| G | 0.4% | 250:1 | 65/35 | 566 | 31 | 0.14 | 85 | 289 | 60% |
| H | 0.7% | 100:1 | 65/35 | 538 | 63 | — | — | 279 | 65% |
| I | 0.6% | 215:1 | 65/35 | None | 60 | — | 215 | 383 | 54% |
| J | 0.4% | 170:1 | 65/35 | 566 | 48 | 0.15 | 93 | 290 | 59% |
| K | 0.4% | 250:1 | 40/60 | 482 | 60 | 0.22 | 93 | 303 | 74% |
| L | 0.5% | 250:1 | 65/35 | 482 | 78 | 0.18 | 118 | 329 | 56% |
| M | 0.6% | 140:1 | 90/10 | 482 | 140 | 0.22 | 142 | 288 | 35% |
| N | 0.2% | 140:1 | 40/60 | 482 | 83 | 0.24 | 102 | 270 | 75% |
| O | 0.2% | 140:1 | 90/10 | 482 | 140 | 0.22 | 142 | 254 | 39% |

Figure 2:
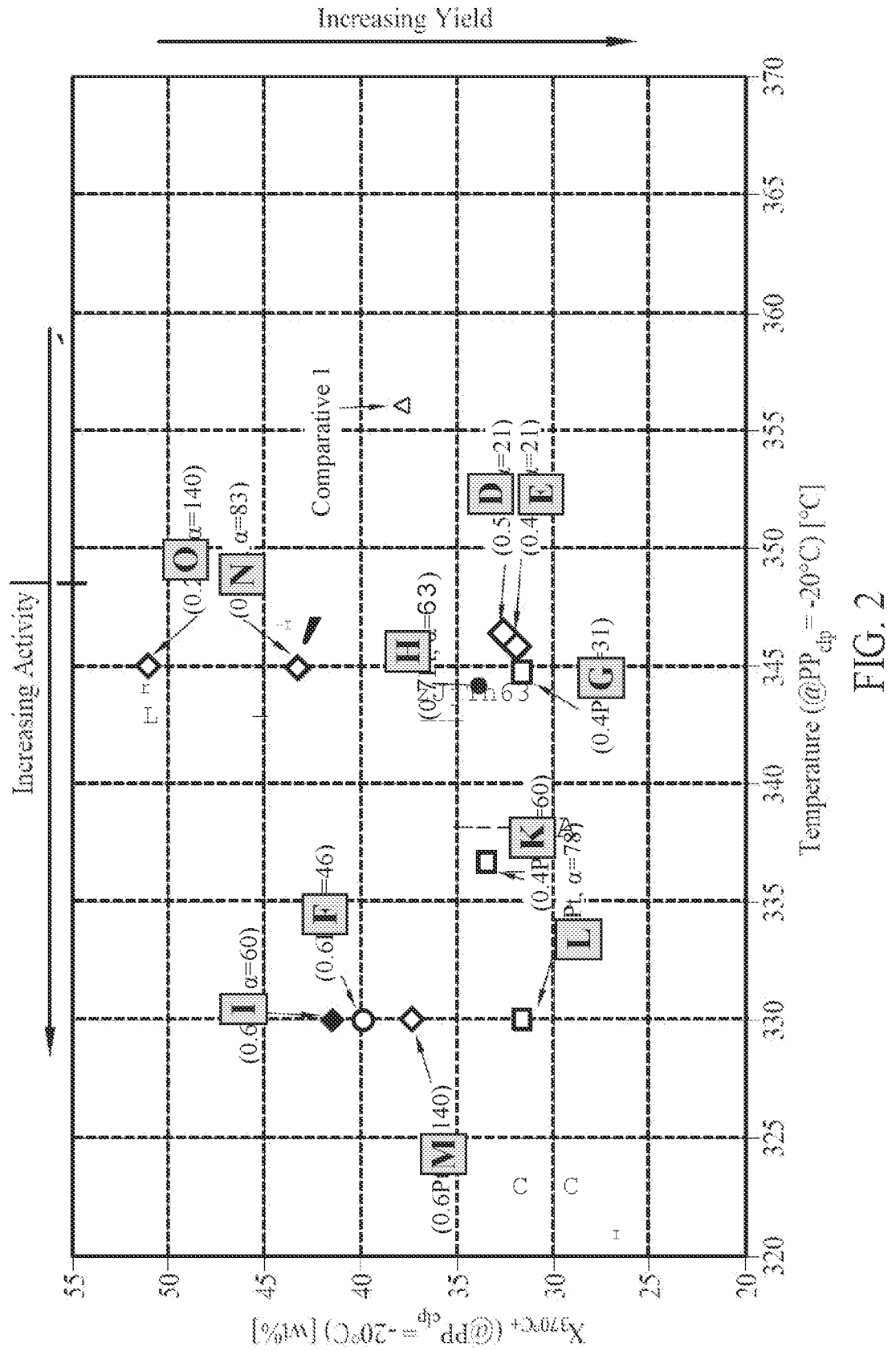
FIG. 2 is a plot of feedstock conversion at 370° C.+ (wt. %) having pour point equal to −20° C. versus isomerization temperature showing improved yields over a lead Example 2 through isomerization processing using optimized ZSM-12 catalysts having particular zeolite to binder ratio.

Catalyst performance is shown in FIG. 2. The isomerization temperatures required to produce a liquid product having a pour point of about −20° C. for various optimized catalysts are plotted against the corresponding weight percent conversion of the 370° C.+ fraction of the feed showing that a number of the optimized catalysts are more active (require lower isomerization temperatures) and are more selective (lower conversions) than Example 2.

As shown in FIG. 2 a wide range of different zeolite binder ratios were tested to illustrate the many of the ZSM-12 compositions show better activity and selectivity than Example 2. For example a 40/60 composition, catalyst E, shows a 15° C. increase in activity and 5% decrease in the conversion of the 370° C.+ fraction of the feed at the equivalent pour points. Similarly, a 65/35 composition, catalyst L, shows a 26° C. improvement in activity with a similar improvement in selectivity as indicated by 5% decrease in the conversion of 370° C.+ molecules. Even at high zeolite contents, 90/10 composition, catalyst M, shows significant improvement in the activity with an equivalent or slightly improved selectivity than Example 2.

As shown in FIG. 2 a wide range of silica to alumina ratios of ZSM-12 crystal were able to achieve improved selectivities over Example 2. Catalysts G and H, silica to alumina ratio of the crystals at 100 and 250, show ~12° C. increase in activity with a 3-6% increase in the selectivity of the catalyst. This suggests that both higher and lower silica to alumina ratios of the crystals, i.e. between 50 and 500, can be used as long as the steaming conditions of the catalyst are adjusted properly to adjust the acidity of the catalyst to the disclosed ranges.

As shown in FIG. 2 a wide range of steaming severities were able to achieve improved selectivities over Example 2. The control of the steaming conditions coupled with both the zeolite content of the extrudates and the starting composition of the crystal are important to produce an active and selective dewaxing catalyst. In the case of catalysts I and F when the ZSM-12 catalysts are not steamed, even though the aluminum content of the crystal is low, the selectivity of the catalyst is debited by 3-4% whereas the activity of the catalyst has significantly increased, i.e. 26° C. increase in activity. However when the catalyst is steamed between temperatures of 482° C. and 566° C., catalysts L and G, respectively, the catalysts show improved activity and selectivity relative to Example 2. Catalysts steamed at temperatures of about 649° C., catalysts A-C, had significantly lower activities than Example 2 as they were unable to produce a liquid product having a pour point of about −20° C. at the highest isomerization temperature tested, 360° C. As shown in FIG. 2 the metal function of the catalyst is important to control to maximize the yield of the product. The amount of metal on the catalyst and the amount of acidity in the catalyst is important to balance the isomerization chemistry. Acid content may be estimated using measured temperature programmed ammonia desorption (TPAD) values on the catalysts prior to metal addition. Not to be bound by theory, the metal on the catalyst has several functions in a lubes dewaxing unit, saturation of aromatics, dehydrogenation of paraffins to olefins, and the hydrogenation of the isomerized olefin to the paraffin. If the metal content is insufficient the isomerization selectivity of the catalyst may be reduced. If the molar ratio of the metal to acid content of the catalyst is below 0.06 the catalyst will be highly unselective. Catalysts N and O show that they have increased activity but the yield of the catalyst is 6-14% worse than Example 2. Conversely, if the ratio is greater than 0.05, preferably greater than 0.10, the catalyst typically has improved yield and activity relative to Example 2. This effect is shown in catalysts labeled D, E, G, and L.

In one embodiment the ZSM-12 catalyst is based upon a high silica synthesis of ZSM-12 and steaming ZSM-12 to control acidity of the material. At steaming temperatures of 482° C., or without steaming, there was excessive catalyst activity at 330° C. and lower yields. Catalysts steamed at 537° C. demonstrated increased activity over Example 2 as well as increased yield, with less zeolite and more binder as shown in FIG. 2. If the steaming conditions are not done properly, the catalyst can become too active and lose yield benefits. Controlling the catalyst process conditions, such as, steaming conditions, zeolite content, and metal/acid control, selective ZSM-12 isomerization catalysts can be produced.

Example 4

Stacked Configurations

Figure 3:
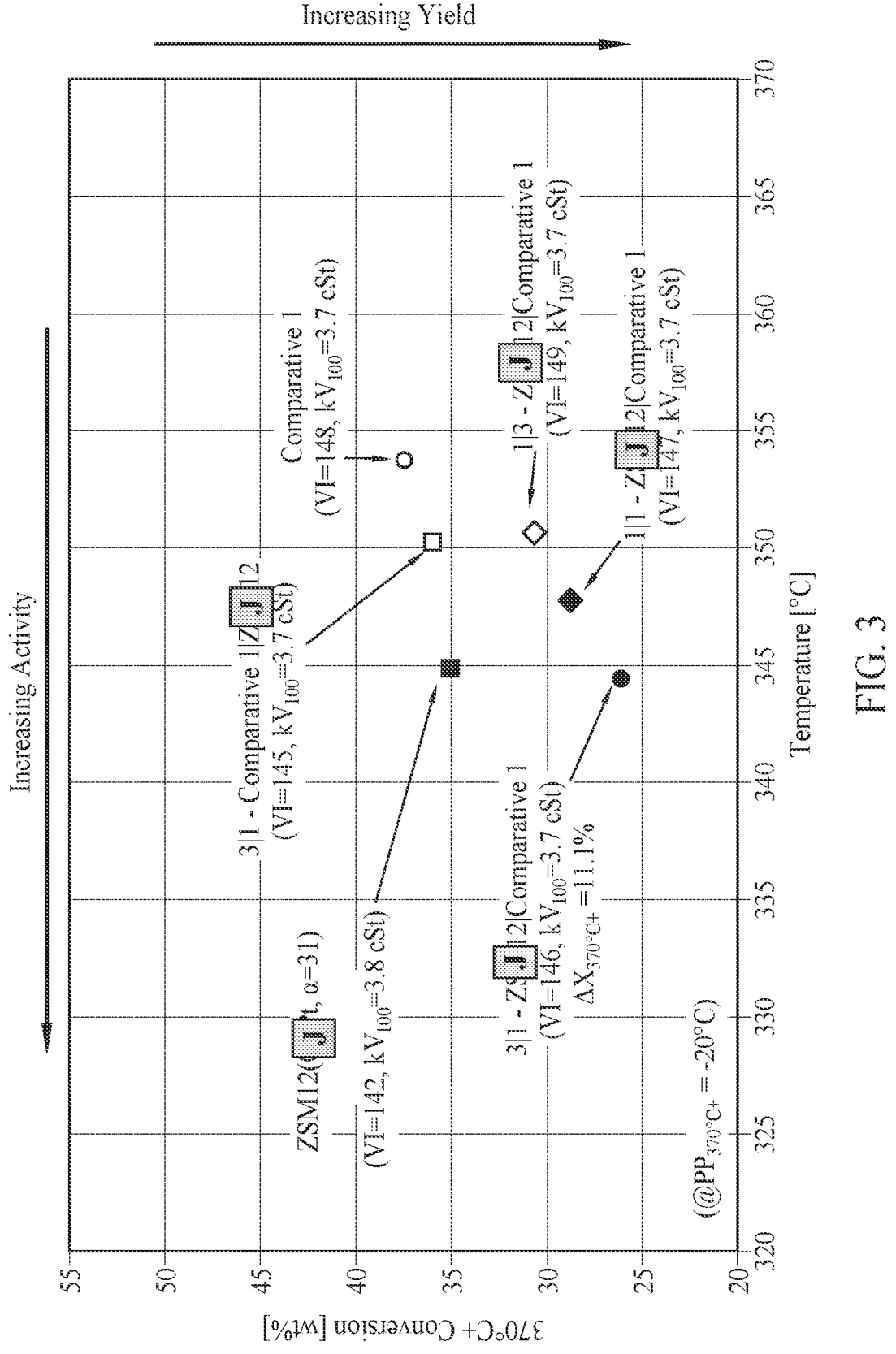
FIG. 3 is a plot of feedstock conversion at 370° C.+ (wt. %) having pour point equal to −20° C. versus isomerization temperature showing increasing activity and increasing yield in an isomerization process where optimized ZSM-12 catalysts are positioned before Example 2 in a stacked bed configuration.
Figure 4:
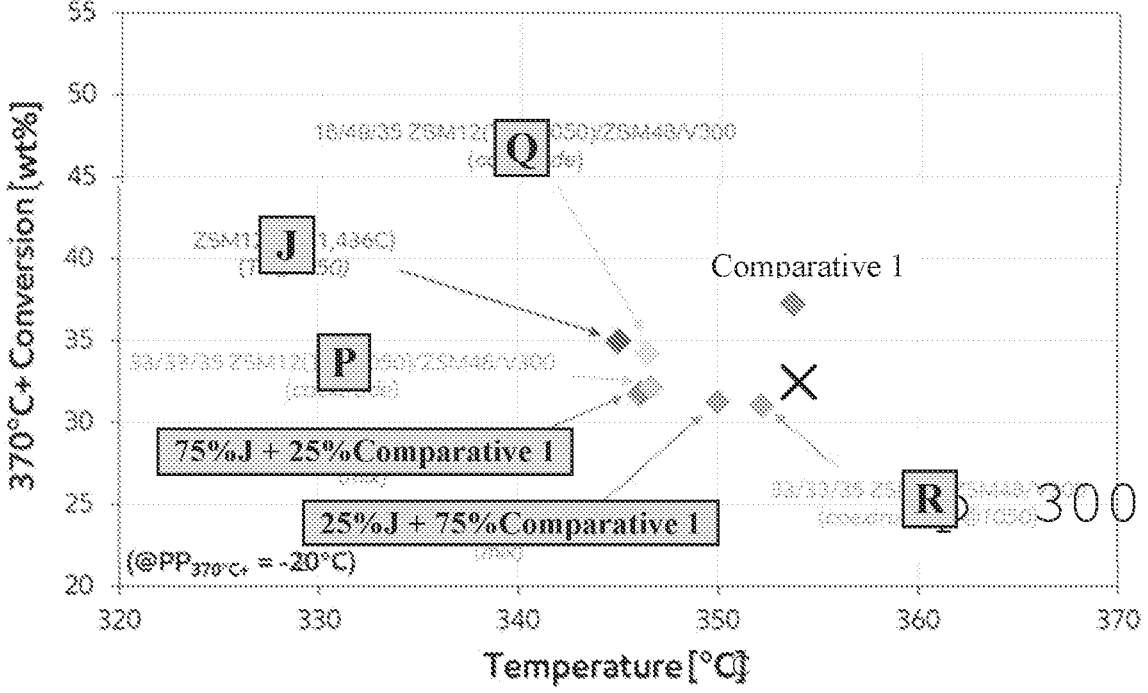
FIG. 4 is a plot of feedstock conversion at 370° C.+ (wt. %) having pour point equal to −20° C. versus isomerization temperature for physically mixed and coextruded catalysts in stacked bed configurations.

Isomerization using optimized catalysts was carried out in a catalyst bed having two or more separate regions in a stacked configuration. As shown in FIG. 3, the isomerization temperatures required to produce a 370° C.+ lube fraction liquid having a pour point of about −20° C. for various stack configurations are plotted against the corresponding weight percent conversion of the 370° C.+ fraction of the feed showing that all of the stack configurations are more active (require lower isomerization temperatures) and are more selective (lower conversions) than Example 2. FIG. 3 shows that stacking an optimized catalyst J before the catalyst of Example 2 increases yield, with minimal impact on kinematic viscosity or viscosity index. All of the stacked configurations shown in FIG. 3 demonstrate improved yields over Example 2 alone. The 3-1 catalyst J/Example 2 stack demonstrated 11.1% improvement in the yield of 370° C.+. Kinematic viscosity remained effectively constant while viscosity index decreased only slightly from 148 to 146.

Catalysts can be physically mixed in stacked bed configurations or co-extruded. In FIG. 5 there are examples of physically mixed catalysts J and Example 2 designated as circles at 75 weight % catalyst J/25 weight % Example 2 and 25 weight % catalyst J/75 weight % Example 2. These catalyst beds were prepared by riffling these catalysts at the weight % above to prepare a well-mixed reactor bed prior. The other co-extruded materials, labels P, Q and R designated as diamonds, were prepared to maximize the performance of each zeolite. Catalyst P was prepared by extruding 33 weight % of the acid form of ZSM-12 crystal steamed at 565° C. for 4 hours, 33 weight % of the acid form of ZSM-48 crystal from Example 2, and 35 weight % alumina. This catalyst was then steamed at 371° C. for 3 hours to form the active acid form of the catalyst. The acid form was impregnated with a platinum amine nitrate solution and calcined in air to produce the metal oxide form. Upon reduction of the catalyst the metal loading is 0.5 weight % Pt metal. Catalyst Q was prepared in a similar manner by extruding 16 weight % of the acid form of ZSM-12 crystal steamed at 565° C. for 4 hours, 49 weight % of the acid form of ZSM-48 crystal from Example 2, and 35 weight % alumina. This catalyst was then steamed at 371° C. for 3 hours to form the active acid form of the catalyst. The acid form was impregnated with a platinum amine nitrate solution and calcined in air to produce the metal oxide form. Upon reduction of the catalyst the metal loading is 0.5 weight % Pt metal. Catalyst R was prepared by extruding 33 weight % of the acid form of ZSM-12 crystal, 33 weight % of the acid form of ZSM-48 crystal from Example 2, and 35 weight % alumina. This catalyst was then steamed at 565° C. for 4 hours to form the active acid form of the catalyst. The acid form was impregnated with a platinum amine nitrate solution and calcined in air to produce the metal oxide form. Upon reduction of the catalyst the metal loading is 0.5 weight % Pt metal. Lower conversion of 370° C.+ was obtained as compared to Example 2 (and thus higher yield), but with a lower isomerization temperature (and thus higher activity). See, FIG. 5. For example, the configuration of co-extruded 33/33/35 ZSM-12/ZSM-48/a lumina, catalyst P, simultaneously demonstrated improved yields with a similar activity to Example 2.

In summary, ZSM-12 frameworks were optimized for selective isomerization catalyst using steaming and variations in silica alumina ratio. The optimized ZSM-12 catalysts demonstrated improved yields and activity over Example 2. The selectivity of the optimized ZSM-12 catalyst increased yield while minimizing cracking, maintaining high kinematic viscosity and viscosity index, and maintaining low pour points.

ADDITIONAL EMBODIMENTS

Embodiment 1. A catalyst useful for dewaxing of a feedstock comprising: between about 40 wt. % and about 99.9 wt. % zeolite, wherein the zeolite comprises a crystal having a largest included sphere less than or equal to about 7.5 angstroms, a largest diffusing sphere greater than or equal to about 5.0 angstroms, and a silica to alumina ratio greater than or equal to about 100:1; between about 0 wt. % and about 60 wt. % binder, wherein the binder is selected from alumina, silica, titania or a mixture thereof; and greater than or equal to about 0.1 wt. % noble metal, wherein the catalyst has a TPAD of less than or equal to about 0.25 mmol/g.

Embodiment 2. The catalyst of any one of the preceding Embodiments, wherein the catalyst has a collidine uptake less than or equal to about 200 μmol/g.

Embodiment 3. The catalyst of any one of the preceding Embodiments, wherein the catalyst has a total surface area less than or equal to about 500 m²/g.

Embodiment 4. The catalyst of any one of the preceding Embodiments, wherein about 20 percent or greater of a total surface area of the catalyst is an external surface area.

Embodiment 5. The catalyst of Embodiment 1, wherein the noble metal is platinum, palladium, or rhodium.

Embodiment 6. The catalyst of Embodiment 1, wherein the noble metal is platinum.

Embodiment 7. The catalyst of Embodiment 1, wherein the catalyst comprises greater than or equal to about 0.3 wt. % noble metal.

Embodiment 8. The catalyst of Embodiment 1, wherein the catalyst comprises greater than or equal to about 0.4 wt. % noble metal.

Embodiment 9. The catalyst of any one of the preceding Embodiments, wherein the zeolite is ZSM-12.

Embodiment 10. The catalyst of any one of the preceding Embodiments, wherein the catalyst has greater than 5 percent micropore volume.

Embodiment 11. The catalyst of any one of the preceding Embodiments, wherein the catalyst has greater than 25 percent metal dispersion.

Embodiment 12. The catalyst of any one of the preceding Embodiments, wherein the crystal has a large pore size.

Embodiment 13. The catalyst of Embodiment 12, wherein the crystal has a pore size between about 5.5 angstroms to about 6.5 angstroms.

Embodiment 14. The catalyst of any one of the preceding Embodiments, wherein the catalyst has an activity (α) of less than about 50.

Embodiments 15. The catalyst of any one of the preceding Embodiments, wherein the crystal comprises 12 ring members (12 MR).

Embodiment 16. The catalyst of any one of the preceding Embodiments, wherein the binder is alumina oxide.

Embodiment 17. The catalyst of any one of the preceding Embodiments, wherein the catalyst has been steamed at temperature of greater than about 482° C.

Embodiment 18. The catalyst of any one of the preceding Embodiments, wherein the catalyst has been steamed at a temperature of about 565° C. for about 4 hours.

Embodiment 19. A catalyst system for dewaxing a feedstock to produce a base stock comprising a catalyst bed having two or more separate regions in a stacked configuration, wherein the two or more separate regions comprise a first region and a second region, the first region comprising one or more of the catalysts of any one of the preceding claims, the second region comprising a catalyst having between about 40 wt. % and about 99.9 wt. % zeolite comprising a crystal having 11 ring members (11 MR) or less, a medium pore size, and a silica alumina ratio greater than or equal to about 50, the first region and the second region are in fluidic communication providing a fluidic pathway of a composition from the first region to the second region.

Embodiment 20. The catalyst system for dewaxing a base stock of Embodiment 20, wherein the catalyst bed comprises about 25 percent to about 100 percent of the catalyst with the large pore size.

Embodiment 21. A catalyst system for dewaxing to produce a base stock of any one of the preceding Embodiments, wherein the catalyst of the second region has a collidine uptake less than or equal to about 100 μmol/g.

Embodiment 22. A catalyst system for dewaxing to produce a base stock of any one of the preceding Embodiments, wherein the catalyst of the second region has an activity (α) of greater than about 50.

Embodiment 23. A catalyst system for dewaxing to produce a base stock of any one of the preceding Embodiments, wherein the catalyst of the second region has a total surface area of less than or equal to 350 m²/g.

Embodiment 24. A catalyst system for dewaxing to produce a base stock of any one of the preceding Embodiments, wherein the catalyst of the first region has an external surface area of greater than or equal to 50 percent of a total surface area of the catalyst.

Embodiment 25. A catalyst system for dewaxing to produce a base stock of any one of the preceding Embodiments, wherein the catalyst of the first region has a micropore volume of greater than 2 percent of a total pore volume of the catalyst.

Embodiment 26. A catalyst system for dewaxing to produce base stock of any one of the preceding Embodiments, wherein the catalyst of the first region comprises a ZSM-48 zeolite.

Embodiment 27. A process for dewaxing a hydrocarbon stream to produce base stocks comprising contacting a hydrocarbon feedstock with one or more of the catalysts or catalyst systems of any one of the preceding claims to provide an increased yield of about 5 percent or greater in the base stock product in comparison to the hydrocarbon feedstock that has not been contacted with the catalyst or the catalyst systems of any one of the preceding claims when dewaxed under equivalent catalytic conditions.

Embodiment 28. The process of Embodiment 27, wherein a moderate activity of the catalyst has been preserved.

Embodiment 29. The process of any one of the preceding Embodiments, wherein the catalyst is pretreated by steaming the catalyst in the first region between about 482° C. and 593° C. for between about one hour and twenty hours.

Embodiment 30. A method of selecting a catalyst for high yield dewaxing of a feedstock to produce a base stock comprising: determining a largest included sphere and a largest diffusing sphere of a zeolite comprising a crystal, wherein the largest included sphere of the crystal is less than or equal to about 7.5 angstroms and the largest diffusing sphere of the crystal is greater than or equal to about 5.0 angstroms; providing a catalyst comprising between about 40 to about 100 wt. % of the zeolite, between 0 about 60 wt. % binder, and a noble metal in an amount greater than or equal to about 0.1 wt. %, wherein the crystal further comprises has a large pore size and 12 ring members (12) and a silica alumina ratio greater than or equal to 100:1, steaming the catalyst between about one hour and about 20 hours at a temperature between about 482° C. and about 593° C.; and dewaxing a hydrocarbon feedstock using the catalyst to provide improved yields of a base stock product.

Embodiment 31. A selective catalyst for high yield selective dewaxing of hydrocarbon feedstock comprising: a zeolite having a crystal, the crystal having a largest included sphere of about 7.5 angstroms and a largest diffusing sphere of about 5.0 to about 5.1 angstroms, a large pore size and 12 ring members (12 MR).

Embodiment 32. A base stock produced according to the process of any of the foregoing Embodiments or produced using the catalyst of any of the foregoing Embodiments.

All numerical values within the detailed description and the claims can modified by "about" or "approximately" the indicated value, taking into account experimental error and variations.

For the sake of brevity, only certain ranges are explicitly disclosed herein. However, ranges from any lower limit can be combined with any upper limit to recite a range not explicitly recited, as well as, ranges from any lower limit can be combined with any other lower limit to recite a range not explicitly recited, in the same way, ranges from any upper limit can be combined with any other upper limit to recite a range not explicitly recited.

Additionally, within a range includes every point or individual value between its end points even though not explicitly recited. Thus, every point or individual value can serve as its own lower or upper limit combined with any other point or individual value or any other lower or upper limit, to recite a range not explicitly recited.

What is claimed is:

1. A catalyst useful for dewaxing of a feedstock comprising:
   between about 40 wt. % and about 99.9 wt. % zeolite, wherein the zeolite comprises a crystal having a largest included sphere less than or equal to about 7.5 angstroms, a largest diffusing sphere greater than or equal to about 5.0 angstroms, and a silica to alumina ratio greater than or equal to about 100:1;
   between about 0 wt. % and about 60 wt. % binder, wherein the binder is selected from alumina, silica, titania or a mixture thereof; and
   greater than or equal to about 0.1 wt. % noble metal, wherein the catalyst has a TPAD of less than or equal to about 0.25 mmol/g, and wherein a metal to acid molar ratio is greater than 0.1.

2. The catalyst of claim 1, wherein the catalyst has a collidine uptake less than or equal to about 200 μmol/g.

3. The catalyst of claim 1, wherein the catalyst has a total surface area less than or equal to about 500 m²/g.

4. The catalyst of claim 1, wherein about 20 percent or greater of a total surface area of the catalyst is an external surface area.

5. The catalyst of claim 1, wherein the noble metal is platinum, palladium, or rhodium.

6. The catalyst of claim 1, wherein the catalyst comprises greater than or equal to about 0.3 wt. % noble metal and/or wherein the catalyst comprises greater than or equal to about 0.4 wt. % noble metal.

7. The catalyst of claim 1, wherein the zeolite is ZSM-12.

8. The catalyst of claim 1, wherein the catalyst has greater than 5 percent micropore volume.

9. The catalyst of claim 1, wherein the catalyst has greater than 25 percent metal dispersion.

10. The catalyst of claim 1, wherein the crystal has a pore size between about 5.5 angstroms to about 6.5 angstroms.

11. The catalyst of claim 1, wherein the catalyst has an activity (α) of less than about 50.

12. The catalyst of claim 1, wherein the crystal comprises 12 ring members (12 MR).

13. The catalyst of claim 1, wherein the binder is alumina oxide.

14. The catalyst of claim 1, wherein the catalyst has been steamed at temperature of greater than about 482° C. and/or wherein the catalyst has been steamed at a temperature of about 565° C. for about 4 hours.

15. A catalyst system for dewaxing a feedstock to produce a base stock comprising a catalyst bed having two or more separate regions in a stacked configuration, wherein the two or more separate regions comprise a first region and a second region, the first region comprising the catalyst of claim 1, the second region comprising a catalyst having between about 40 wt. % and about 99.9 wt. % zeolite comprising a crystal having 11 ring members (11 MR) or less, a medium pore size, a metal to acid molar ratio greater than 0.1, and a silica alumina ratio greater than or equal to about 50, the first region and the second region are in fluidic communication providing a fluidic pathway of a composition from the first region to the second region.

16. The catalyst system for dewaxing a base stock of claim 15, wherein the catalyst bed comprises about 25 percent to about 100 percent of the catalyst with the large pore size.

17. The catalyst system for dewaxing a base stock of claim 15, wherein the catalyst of the second region has a collidine uptake less than or equal to about 100 μmol/g.

18. The catalyst system for dewaxing a base stock of claim 15, wherein the catalyst of the second region has an activity (α) of greater than about 50.

19. The catalyst system for dewaxing a base stock of claim 15, wherein the catalyst of the second region has a total surface area of less than or equal to 350 m²/g.

20. The catalyst system for dewaxing a base stock of claim 15, wherein the catalyst of the first region has an external surface area of greater than or equal to 50 percent of a total surface area of the catalyst.

21. The catalyst system for dewaxing a base stock of claim 15, wherein the catalyst of the first region has a micropore volume of greater than 2 percent of a total pore volume of the catalyst.

22. The catalyst system for dewaxing a base stock of claim 15, wherein the catalyst of the first region comprises a ZSM-48 zeolite.

\* \* \* \* \*